Patented Dec. 30, 1947

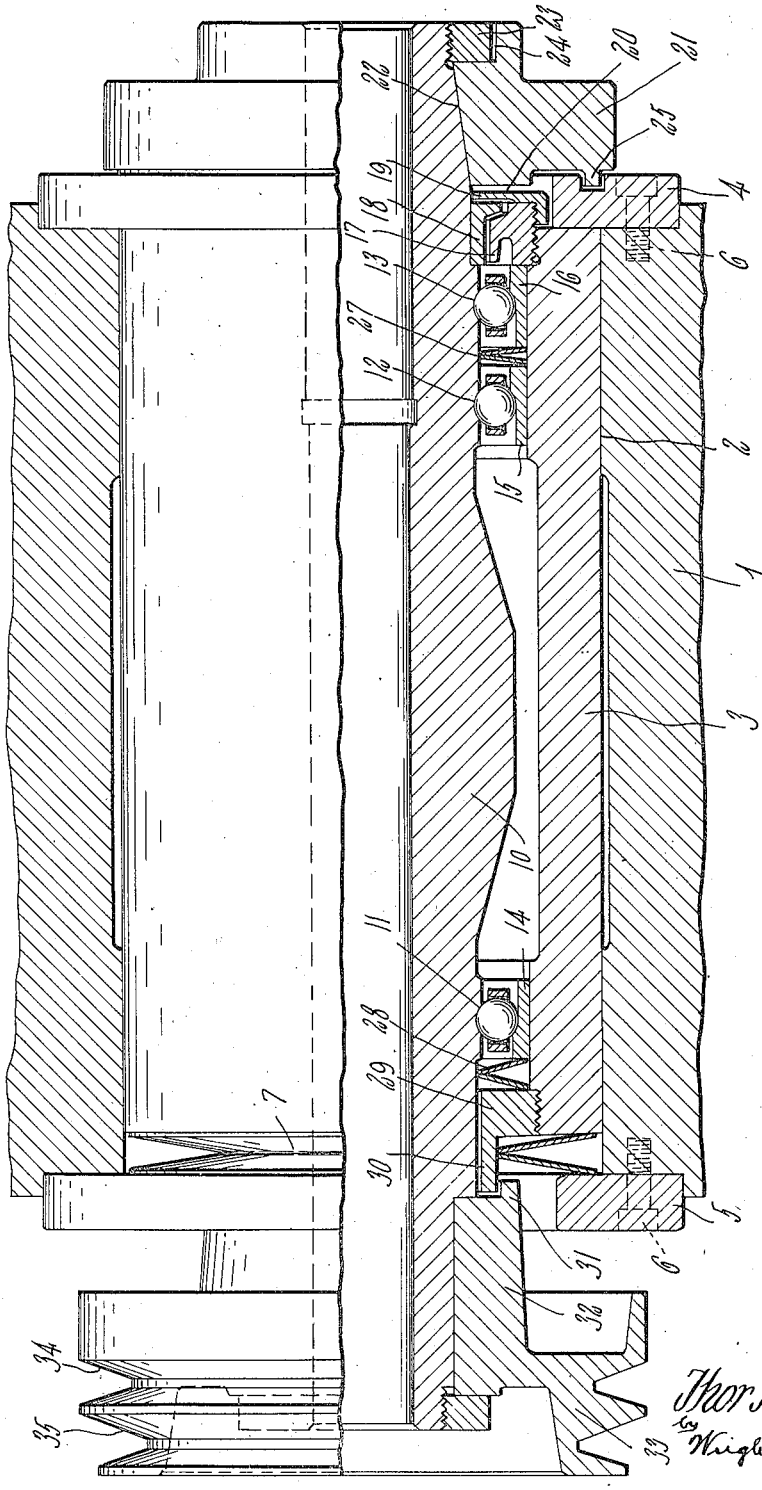

2,433,518

UNITED STATES PATENT OFFICE 2,433,518

WORK SPINDLE MOUNTING

Thor H. Ljunggren, Charlestown, N. H., assignor to Bryant Chucking Grinder Company, Springfield, Vt., a corporation of Vermont Application June 30, 1945, Serial No. 602,611

4 Claims. (Cl. 308—189)

This invention relates to work spindle mountings of a type particularly suitable for rotatably supporting work to be ground.

One object of the present invention is to provide a spindle mounting which will deform substantially evenly due, for example, to the temperature differential between the active and the supporting parts of the spindle, lack of which heretofore has been a cause of considerable difficulty.

A further object is to provide simple means for axially loading the bearings so that they may hold the spindle without end play and provided with means for automatically taking up wear.

A further object is to provide a construction wherein temperature changes in the spindle will not act to distort the supporting frame.

Still another object is to simplify and rigidify the structure by forming inner ball bearing raceways integral with the spindle and pressing outer raceways of the combination or angular contact type in opposite directions to load the bearings.

Further objects and advantages will appear from a description of an embodiment of the invention shown in the single figure which is a fragmentary view partly in side elevation and partly in longitudinal section of a spindle and its mounting embodying the invention.

Referring to the drawing, at 1 is indicated a supporting frame having a bore 2 extending therethrough. Within the bore is positioned a sleeve 3 of sufficiently smaller diameter to take care of the differential of thermal expansion between the sleeve and the frame 1. At one end of the bore near to the work supporting chuck, the frame 1 is provided with an abutment shown as a ring 4 against which one end of the sleeve 3 may be clamped sufficiently to prevent movement of the sleeve due to torsion and thrust forces. Beyond the opposite end of the sleeve is a second abutment comprising a ring 5 secured to the frame and spaced from the adjacent end of the sleeve 3. Abutments 4 and 5 may be secured to the frame by any suitable means such as screws 6. Between the abutment 5 and the adjacent end of the sleeve 3 is positioned spring means which forces the sleeve 3 against the abutment 4 while it also takes care of the difference of lengthwise thermal expansion of the sleeve 3 and the frame 1. As shown this spring means comprises a pair of oppositely facing Belleville washers 7. These are particularly suitable for the purpose since they impart a heavy spring pressure under slight deformation, may have a substantially constant load curve throughout a sizable range of deflection, and occupy small space.

Within the sleeve 3 is journaled the spindle 10. As shown this spindle is provided with axially spaced grooves 11, 12 and 13, the grooves 12 and 13 being relatively close together and positioned adjacent to the end of the spindle which engages the abutment 4. These grooves 11, 12 and 13 form the inner raceways for ball bearings, the outer raceways being shown at 14, 15 and 16, respectively. The outer raceways are of angle contact type, the outer raceways 14 and 15 being arranged with their outer contact faces opposed and facing each other, while the outer raceway 16 is faced in the same direction as the ring 15. The ring 16 engages the end of an externally threaded collar 17 threaded into the sleeve 3 and this collar 17, and a mating collar 18 carried by the spindle 13, are formed to provide between them a labyrinth packing which is also further constituted by an inwardly directed flange 19 on an angle collar 20 threaded onto the outer end of the collar 17.

A standard spindle nose 21 having a tapered inner face 22 engages a mating tapered face on the adjacent end of the spindle and is held in position thereon by a collar 23 threaded on the outer end of the spindle and seated in an annular recess 24 in the spindle nose member 21. This spindle nose may receive and have attached thereto a work supporting chuck (not shown) of any desired type. The confronting faces of the ring abutment 4 and the spindle nose member 21 are also shaped to provide a labyrinth packing therebetween as shown at 25. This arrangement effectively seals off the bearings from access of foreign matter from the nose end of the spindle.

The outer bearing raceway 16 is held against the ring 17 and the outer raceway 15 is pressed away from the ring 16 by spring means such as the pair of Belleville washers at 27, and this pressure against the outer bearing raceway 15 urges this raceway in a direction to take up wear in this ball bearing, pressing the raceway 15 axially against the bearing balls. The outer raceway 14 is pressed to the right so as to exert loading pressure against the balls of its bearing as by a pair of Belleville washers 28 which coact between it and a collar 29 threaded into the adjacent end of the sleeve 3. This arrangement provides a second ball bearing adjacent to the load carrying end of the spindle, this giving better load distribution, and the use of the Belleville spring washers insures the desired load distribution with reasonable commercial tolerance in the axial spacing of the inner raceway grooves 11, 12 and 13. This collar 29 has a sleeve extension 30 which extends past the Belleville washers 7 and beyond the inner face of the abutment ring 5 to form with the inner extension 31 of the hub 32 of a driving pulley, a labyrinth packing preventing entrance of foreign matter into the bearings from the pulley end of the spindle. As shown the pulley 33 is provided with V-grooves 34 and 35 to receive a V-belt by which the pulley and the spindle may be driven.

It will be noted that the inner raceways for the ball bearings are integral with the spindle and that the outer raceways are angle bearing raceways two of which are arranged in opposed relation and provided with axial thrust members which maintain them in loaded condition and prevent end play of the spindle. It will also be noted that the spindle is mounted in a sleeve which is held rigidly at the end adjacent to the spindle nose where the work is positioned, but is free to expand and contract axially, sliding within the frame in response to temperature changes of the spindle and its immediate bearings. This provides against expansion and contraction stresses from being transmitted to the frame which would be liable to cause distortions therein which would effect the alinement of the spindle with reference to the frame. The springs 7, however, provide for variations in position of the pulley end of the bearing sleeve.

From the foregoing description of an embodiment of this invention, it should be evident to those skilled in the art that various changes and modifications might be made without departing from the spirit or scope of this invention.

I claim:

1. In combination, a spindle having a pair of axially spaced peripheral grooves forming inner ball bearing raceways, a sleeve within which said spindle extends, a frame member having a bore receiving said sleeve, a collar overlapping one end of said bore secured to said member, a disk secured to said spindle outwardly of and overlapping said collar, said collar and disk having confronting faces shaped to define a labyrinth packing therebetween, a second collar overlapping said bore and secured to said frame beyond the opposite end of said sleeve, a spring interposed between said second collar and said opposite end, outer angle contact raceways carried at the inner face of said sleeve and spaced axially corresponding to the axial spacing of said spindle grooves, balls positioned between said inner and outer raceways, a sleeve collar secured to the inner face of said sleeve outwardly of and in contact with one of said outer raceways, a second sleeve collar within said sleeve outwardly of the other of said outer raceways, and a spring between said second sleeve collar and said other outer raceway.

2. In combination, a spindle having a pair of axially spaced peripheral grooves forming inner ball bearing raceways, a sleeve within which said spindle extends, a frame member having a bore receiving said sleeve, a collar overlapping one end of said bore secured to said member, a disk secured to said spindle outwardly of and overlapping said collar, said collar and disk having confronting faces shaped to define a labyrinth packing therebetween, a second collar overlapping said bore and secured to said frame beyond the opposite ends of said sleeve, a spring interposed between said second collar and said opposite end, outer angle contact raceways carried at the inner face of said sleeve and spaced axially corresponding to the axial spacing of said spindle grooves, balls positioned between said inner and outer raceways, a sleeve collar secured to the inner face of said sleeve outwardly of and in contact with one of said outer raceways, said sleeve, collar and said spindle having confronting labyrinth packing faces.

3. In combination, a frame having a bore therein, a sleeve within said bore, abutments carried by said frame at opposite ends of said sleeve, a spring interposed between one of said abutments and the adjacent end of said sleeve pressing said sleeve toward the other of said abutments, axially spaced reversely positioned outer angle contact raceways positioned inwardly of said sleeve, springs engaging and pressing one of said raceways axially, the other of said raceways nearer to said other abutment being axially stationary, a spindle in said sleeve and balls interposed between said spindle and outer raceways.

4. In combination, a spindle having a work supporting end, said spindle having a pair of axially spaced inner ball bearing raceway grooves adjacent to said end and an inner ball bearing raceway groove toward the opposite end of said spindle, outer angular contact ball bearing raceways for each of said grooves, balls in said grooves and within said outer raceways, a fixed element against which the outer raceway nearest to said spindle end bears, spring means between the pair of outer raceways adjacent to said end, and spring means engaging the outer raceway toward the opposite end of said spindle, both of said spring means pressing their respective outer raceways in directions to load said bearings axially and radially of said spindle.

THOR H. LJUNGGREN.

REFERENCES CITED

The following references are of record in the file of this patent:

UNITED STATES PATENTS

| Number | Name | Date |
| --- | --- | --- |
| 1,956,305 | Baninger | Apr. 24, 1934 |
| 1,508,085 | Cooper | Sept. 9, 1924 |
| 1,767,429 | Brittain | June 24, 1930 |
| 1,923,777 | Delaval-Crow | Aug. 22, 1933 |
| 2,227,697 | Blood | Jan. 7, 1941 |

FOREIGN PATENTS

| Number | Country | Date |
| --- | --- | --- |
| 360,476 | Great Britain | Nov. 9, 1931 |